US011512442B2

(12) United States Patent
Borkgren

(10) Patent No.: US 11,512,442 B2
(45) Date of Patent: Nov. 29, 2022

(54) ANIMAL WASTE COLLECTION DEVICE WITH CLOSABLE CONTAINER

(71) Applicant: Stanley Borkgren, Geneseo, IL (US)

(72) Inventor: Stanley Borkgren, Geneseo, IL (US)

( * ) Notice: Subject to any disclaimer, the term of this patent is extended or adjusted under 35 U.S.C. 154(b) by 146 days.

(21) Appl. No.: 17/151,324

(22) Filed: Jan. 18, 2021

(65) Prior Publication Data
US 2022/0228334 A1 Jul. 21, 2022

(51) Int. Cl.
E01H 1/12 (2006.01)
A01K 23/00 (2006.01)

(52) U.S. Cl.
CPC .......... E01H 1/1206 (2013.01); A01K 23/005 (2013.01); E01H 2001/1293 (2013.01)

(58) Field of Classification Search
CPC .......... E01H 1/1206; E01H 2001/1293; A01K 23/005
See application file for complete search history.

(56) References Cited

U.S. PATENT DOCUMENTS

| 386,840 | A | 7/1888 | Merrithew |
| 418,261 | A | 12/1889 | Wright |
| 611,205 | A | 9/1898 | Moffitt |
| 624,714 | A | 5/1899 | Washington |
| 663,906 | A | 12/1900 | Knox |
| 778,082 | A | 12/1904 | Spangler |
| 778,083 | A | 12/1904 | Strauss |
| 779,227 | A | 1/1905 | Lunken |
| 3,002,209 | A | 10/1961 | McKinstry |
| 3,431,008 | A | 3/1969 | Narita |
| 3,781,940 | A | 1/1974 | Lehrer |
| 4,042,269 | A | 8/1977 | Skermetta |
| 4,119,337 | A * | 10/1978 | Sherhandt ............. E01H 1/1206 294/1.4 |
| 4,184,513 | A * | 1/1980 | Bonney .................. F15B 13/06 137/596.2 |
| 4,194,777 | A | 3/1980 | Carns |
| 4,225,174 | A | 9/1980 | Hennessy et al. |
| 4,290,386 | A | 9/1981 | Eiriksson |
| 4,368,907 | A | 1/1983 | Ross |
| 4,741,566 | A | 5/1988 | Byung-Do et al. |
| 4,776,621 | A | 10/1988 | Streit |
| 4,900,077 | A | 2/1990 | Beck |
| 4,909,553 | A | 3/1990 | Hantover |
| 5,037,149 | A | 8/1991 | Beck |

(Continued)

Primary Examiner — Stephen A Vu
(74) Attorney, Agent, or Firm — Nyemaster Goode, P.C.

(57) ABSTRACT

An animal waste collection and transport device having a container and a handle. The container includes an opening configured to receive animal waste. The handle has a first portion and a second portion. The first portion is adapted to be grasped by the operator. The second portion has a lid and a waste scraping tool such as a shovel, hoe, or rake and is used to help move the animal waste into the container. The device includes an attachment assembly selectively movable between a first position where the container and handle are attached to each other and a second position wherein the container and handle are detached (or detachable) from each other so the scraping tool can be used to direct animal waste into the container. In the first position the waste scraping tool is positioned inside the container and the lid covers the opening in the container to seal the scraping tool and any animal waste inside the container.

22 Claims, 22 Drawing Sheets

(56) References Cited

U.S. PATENT DOCUMENTS

| | | | |
|---|---|---|---|
| 5,039,148 A | 8/1991 | Brautovich | |
| 5,054,828 A | 10/1991 | Hantover | |
| 5,269,575 A | 12/1993 | Parvaresh | |
| 5,318,330 A | 6/1994 | Dombrowski | |
| 5,355,836 A | 10/1994 | Vallery | |
| 5,409,279 A | 4/1995 | Magee | |
| 5,564,763 A | 10/1996 | Mercurio | |
| 5,832,063 A * | 11/1998 | Vysotsky | H04M 3/44 704/E15.04 |
| 6,135,520 A * | 10/2000 | Miller | E01H 1/1206 294/1.4 |
| 6,158,395 A | 12/2000 | Bauklon | |
| 6,164,710 A | 12/2000 | Shibuya | |
| 7,090,268 B2 | 8/2006 | Borman | |
| 7,204,532 B2 | 4/2007 | Lefevre | |
| 7,267,381 B2 | 9/2007 | Cafferty | |
| 7,631,910 B2 | 12/2009 | Shalhoub | |
| 7,789,441 B1 | 9/2010 | Conway | |
| 8,002,318 B2 | 8/2011 | Saber | |
| 8,235,434 B2 * | 8/2012 | Lipscomb | A01K 1/0114 294/1.4 |
| 8,342,138 B2 | 1/2013 | Hazan | |
| D716,005 S | 10/2014 | McNay | |
| 9,131,661 B2 | 9/2015 | Spandau | |
| 9,439,398 B2 | 9/2016 | Vainer | |
| 9,546,460 B1 | 1/2017 | Nicol | |
| 9,719,223 B2 * | 8/2017 | Johnson | A01K 23/005 |
| 9,828,732 B2 | 11/2017 | Vas | |
| 9,970,168 B2 | 5/2018 | Krause | |
| 9,999,200 B1 | 6/2018 | Desimone | |
| 10,041,220 B1 | 8/2018 | Johnson | |

\* cited by examiner

ANIMAL WASTE COLLECTION DEVICE WITH CLOSABLE CONTAINER

BACKGROUND

Field of the Invention

This invention relates generally to animal waste collection. More specifically, the present invention relates to a device and method for sanitary collection of animal waste and transport to a disposal site.

Description of the Related Art

Collecting and properly disposing of dog waste is commonly practiced and legally required in some locations. This is done by various methods and devices. One method is for the pet owner to place a plastic bag over his/her hand and pick up the waste. Pulling the bag inside out over the hand places the waste inside the bag. At times the waste volume may be more than can be picked up in one hand or the bag may tear due to fingernails or objects on the ground, creating an unsanitary situation. Further, this method requires the person to bend over and have their face within arm's reach of the waste. The waste is then carried in the bag by hand to the disposal site.

Yet another method includes the use of a rake or hoe to move the waste onto a tray mounted to a shaft. The tray is then carried to the disposal site. It is difficult to balance the waste on the tray while carrying it any distance and the waste is exposed allowing the odor to spread. Carrying two separate objects is also inconvenient.

One commercially available device uses a ring or hoop on the end of a handle to which a plastic bag is attached. The bag is to be placed under the dog as it excretes the waste. This requires coordination with the dog and difficulty if the bag is missed. The bag is then removed from the hoop by hand to close the bag and contain the odor.

Yet another device uses two opposing surfaces that pivot together in a clam-like action. They may use dual handles or a mechanical mechanism to open and close the collection surfaces. This system requires the waste to be picked up in one grasp of the device, and with some devices it is difficult to view the placement and collection of the waste. The mating surfaces do not seal to contain the odor. Further, surfaces which may come into contact the waste are exposed, which may lead to contamination of anything it contacts.

Therefore, what is needed is a device and method that overcomes these and other disadvantages.

SUMMARY

One aspect of the invention relates to an animal waste collection and transport device having a container and a handle. The container includes an opening configured to receive animal waste. The handle has a first portion and a second portion. The first portion is adapted to be grasped by the operator. The second portion has a waste scraping tool such as a shovel, hoe, or rake and is used to help move the animal waste into the container. The device includes an attachment assembly selectively movable between a first position where the container and handle are attached to each other and a second position wherein the container and handle are detached (or detachable) from each other. The attachment assembly includes an engagement member movable between an engaged position wherein the container is attached to the handle and a release position wherein the container is detachable from the handle. In some embodiments the engagement member and other components of the attachment assembly fit together tightly in an interference fit so that some amount of force is required to move the attachment assembly from its first position to its second position. In other embodiments the attachment assembly includes a spring or other suitable elastic member which provides a biasing force against the engagement member to help secure the engagement member in its first position. In these embodiments the spring may be operably combined with a button, lever, rope, cable, or other suitable mechanical or electrically actuated mechanism for moving the spring to its second or release position to allow the engagement member to move to its second position and the container to be detached from the handle. In some embodiments the second portion of the handle is received within the container when the attachment assembly is in its first position so that all waste contacting surfaces are enclosed within the container when the attachment assembly is in the first position.

Another aspect of the invention relates to a method of using an animal waste collection and transport device. The method includes taking an animal waste collection and transport device having a container, a handle, and an attachment assembly selectively movable between a first position where the container and handle are attached to each other and a second position wherein the container and handle are detached (or detachable) from each other. Moving the attachment assembly from its first position to its second position, then using the second portion of the handle to move the waste into the container. After the waste is in the container, moving the attachment assembly from its second position to its first position wherein the waste and the second portion of the handle are sealed inside the container by a lid that is combined with the handle. In this manner all surfaces that are required to contact the animal waste are sealed inside of the container when it is in the closed position. This invention is designed to keep the waste an acceptable distance away from the operator and to keep the waste, odor and all surfaces that contact the waste inside a closed container. Further, this device is designed to be able to collect multiple piles of waste before emptying. This device used properly will keep the waste away from the person's hands at all times. This invention is easily customized with different handles and shafts to suit the operator. This device may be used as a hiking staff or cane when the container is closed and latched. The container size is scalable for different waste volume requirements. The components may be made of various materials, such as plastic, to facilitate cleaning. The lid and container mating surfaces may or may not have a gasket to help create a seal. Attachment points may be added to the container such that a disposable plastic bag may be used to line the container.

In another embodiment, the shaft is replaced with an intermediate attachment member having channel configured to receive retainer members on the container and lid. The intermediate attachment member may be a singular piece with a handle. Alternatively, the intermediate attachment member may be attached to a shaft or separate handle. In this embodiment, the lid may include an engagement member movable between an engaged position wherein the container is attached to the intermediate attachment member and a release position wherein the container is detachable from the intermediate attachment member. The engagement member is configured to interfere with a portion of the channel so that the lid is secured to the intermediate attachment member in the engagement position and able to move relative to the intermediate attachment member in the release position.

In another embodiment, the shaft is incorporated into the lid and the intermediate attachment member slides on the contact surface of the lid.

In another embodiment, the intermediate attachment member and shaft may be incorporated into one unit to engage with the lid and container.

BRIEF DESCRIPTION OF THE DRAWINGS

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "some embodiments" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 6A is rear perspective view of the animal waste collection and transport device showing the handle detached from the container.

DETAILED DESCRIPTION

Figure 1:
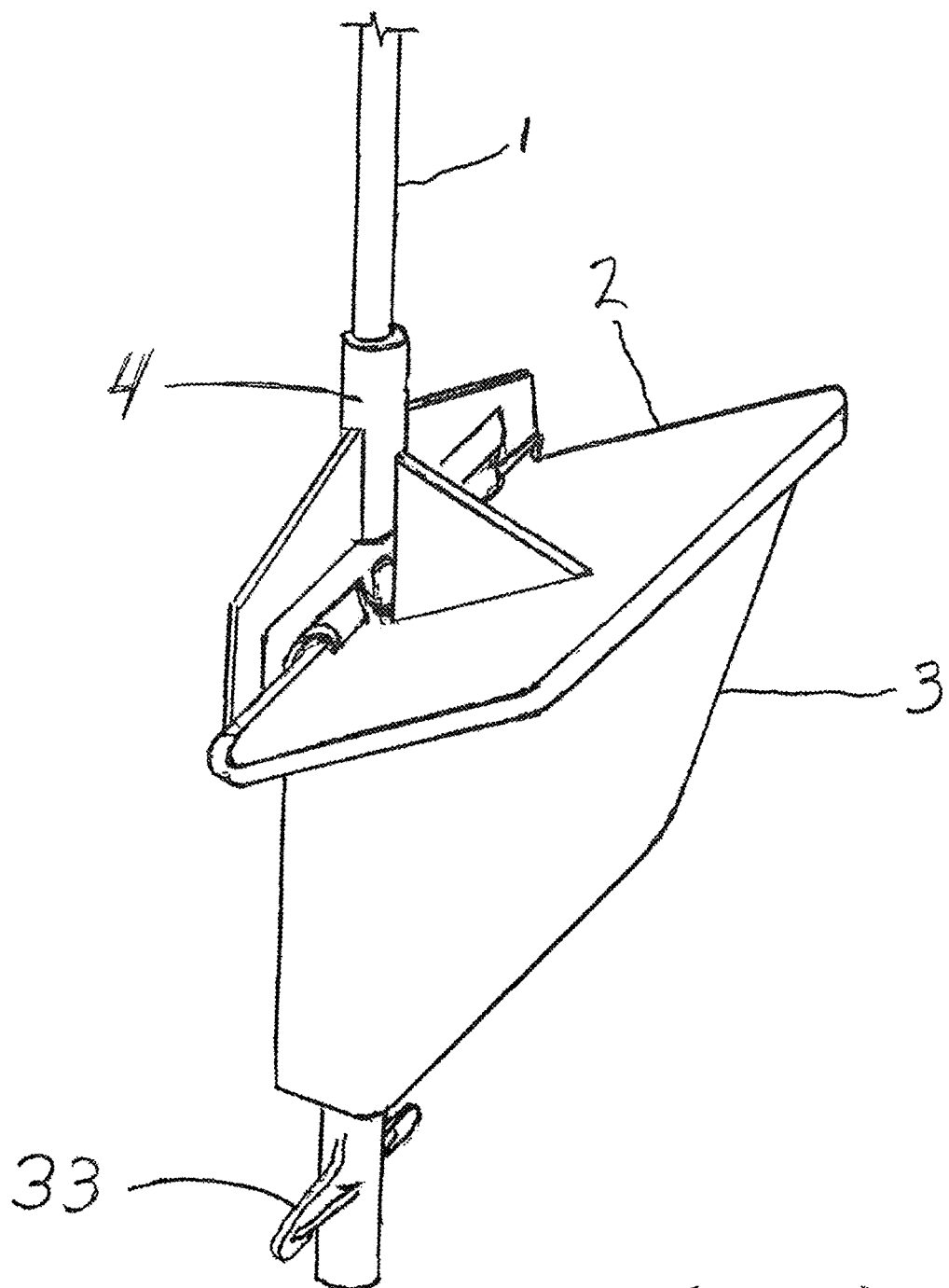
FIG. 1 is a perspective view of the animal waste collection and transport device wherein the container is secured to the shaft.

FIGS. 1-6 show a first embodiment of the animal waste collection and transport device. The device includes a container 3 and a handle 1. The container 3 has an opening 36 configured to receive the animal waste. The handle 1 is an elongated member such as a shaft having a first portion and a second portion. The first portion is adapted to be grasped by the operator. The second portion has a waste scraping tool 13 such as a shovel, hoe, or rake and is used to help move the animal waste into the container 3 as further described below. The handle 1 is combined with a handle passage 4 near its second portion. The handle passage 4 is a sleeve having an opening through which a portion of the handle 1 is able to move. The handle 1 may be of different lengths or sizes, static or telescoping. The handle 1 may have an axial shape other than round. The device includes an attachment assembly selectively movable between a first position where the container 3 and handle 1 are attached to each other and a second position wherein the container 3 and handle 1 are detached (or detachable) from each other.

In the embodiment shown in FIGS. 1-6, the attachment assembly includes an engagement member such as pin 6 attached to a lower portion of the handle 1 and movable within a first channel 11 formed in a portion of the handle passage 4 and a second channel 7 formed in a portion of the container 3 referred to herein as the container passage 5. Movement of the handle 1 causes the corresponding movement of the pin 6 between a first position (FIG. 2) wherein the container 3 is attached to the handle 1 and a second position (FIG. 3) wherein the container 3 is detachable from the handle 1. In some embodiments the engagement member and other components of the attachment assembly fit together tightly in an interference fit so that some amount of force is required to move the attachment assembly from its first position to its second position. The first channel 11 and second channel 10 include an area having an opening narrower than the diameter or thickness of the pin 6 to provide a friction fit between the pin 6 and the respective portion of the two channels 11, 10. The first friction fit region 12 is near the top of the first channel 11 and the second friction fit region 7 is near the bottom of the second channel 10 to help secure the pin 6 in its first or second position.

Figure 2:
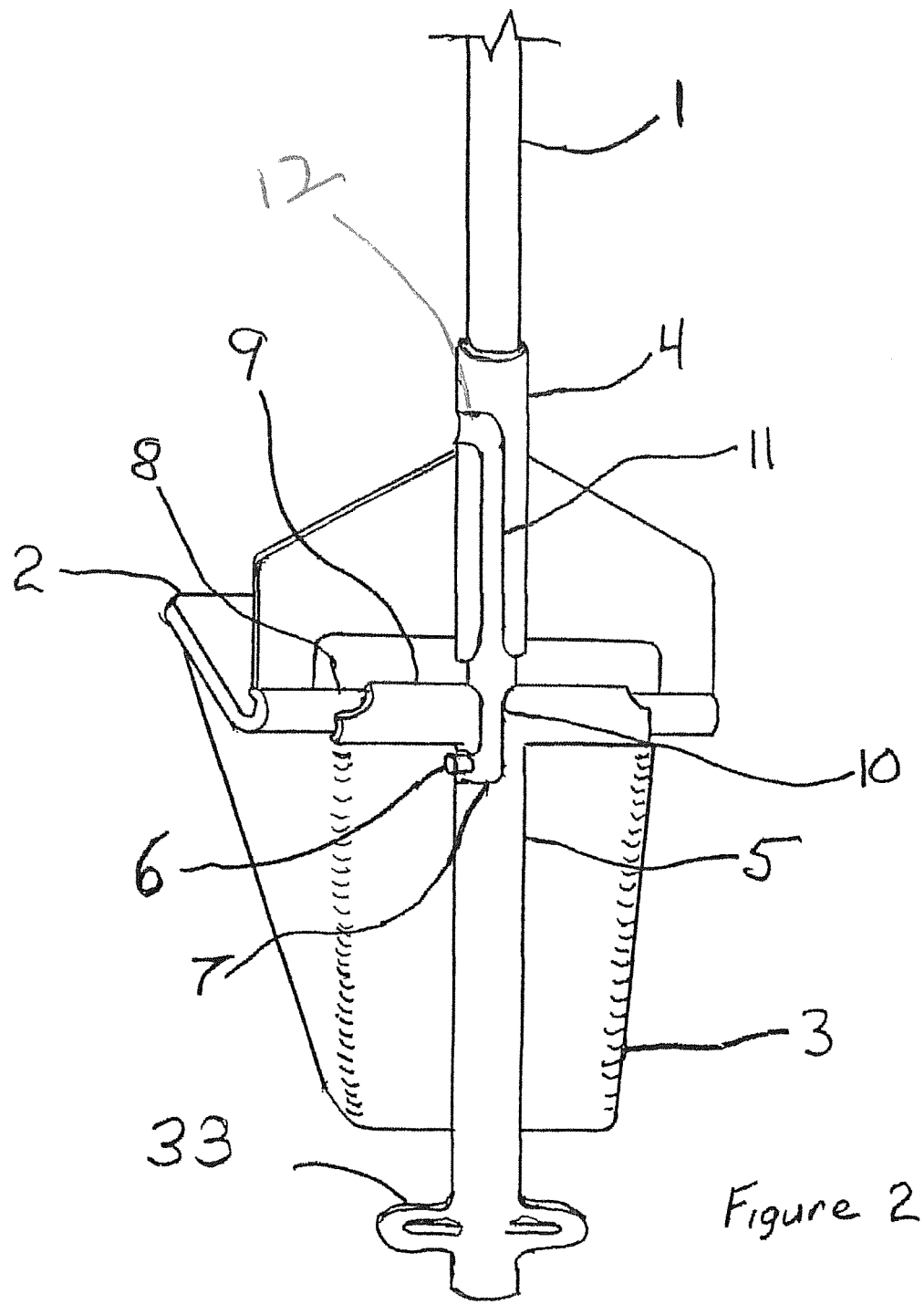
FIG. 2 is a rear perspective view of the animal waste collection and transport device showing the attachment assembly in the closed and latched configuration.

FIG. 2 shows the attachment assembly in its first position wherein the handle 1 extends through the handle passage 4 and into the container passage 5. The pin 6, mounted to the handle 1, is positioned in the second friction fit region 7 of the container 3. The handle 1 is latched in this position when the pin 6 is secured in the second friction fit region 7.

Figure 3:
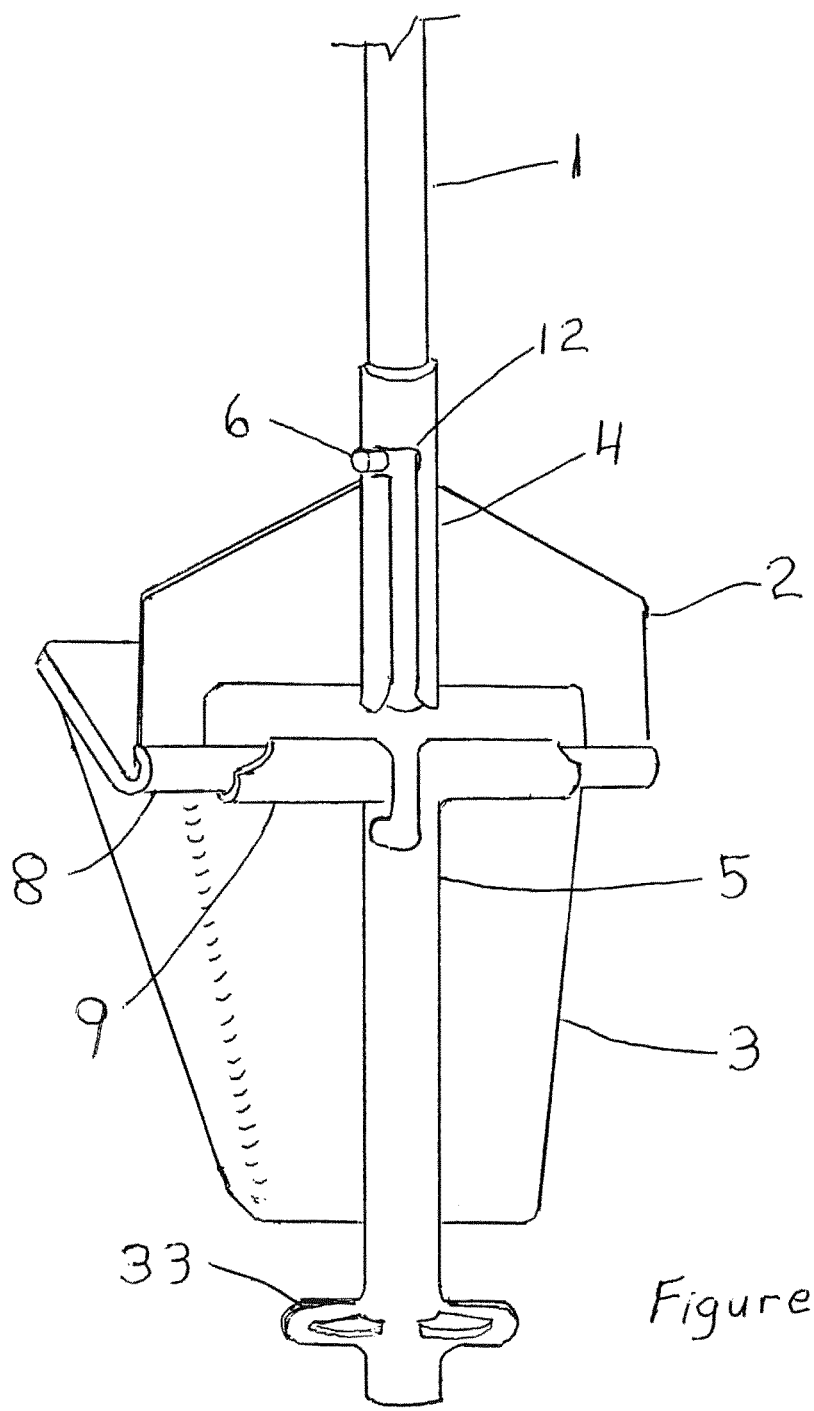
FIG. 3 is a rear perspective view of the animal waste collection and transport device showing the attachment assembly in the closed and unlatched configuration.

FIG. 3 shows a perspective view of the attachment assembly in its second position wherein the container 3 is closed yet the pin 6 is unlatched so the container 3 is detachable from the handle 1. The handle 1 has been moved so the pin 6 is in the shaft passage 4 and above the container passage 5. The handle 1 has been raised and rotated so the pin 6, mounted to the handle 1, is positioned in the handle's 1 first friction fit region 12. The handle 1 is detachable from the container 3 in this position. However, the hinge (described below) keeps the two components 1, 3 connected and rotatable relative to one another until they are separated as further described below.

Figure 4:
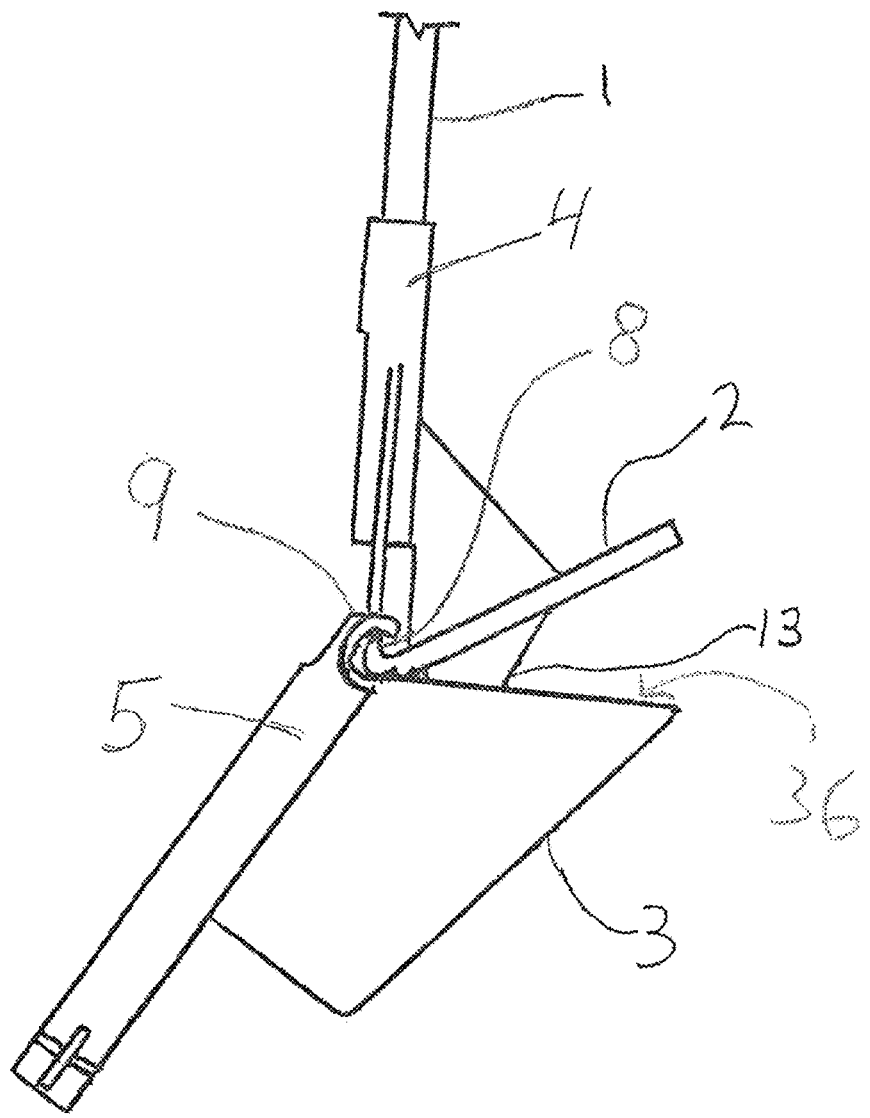
FIG. 4 is a side view of the animal waste collection and transport device showing the device partially opened revealing the scraping tool in the container.
Figure 5:
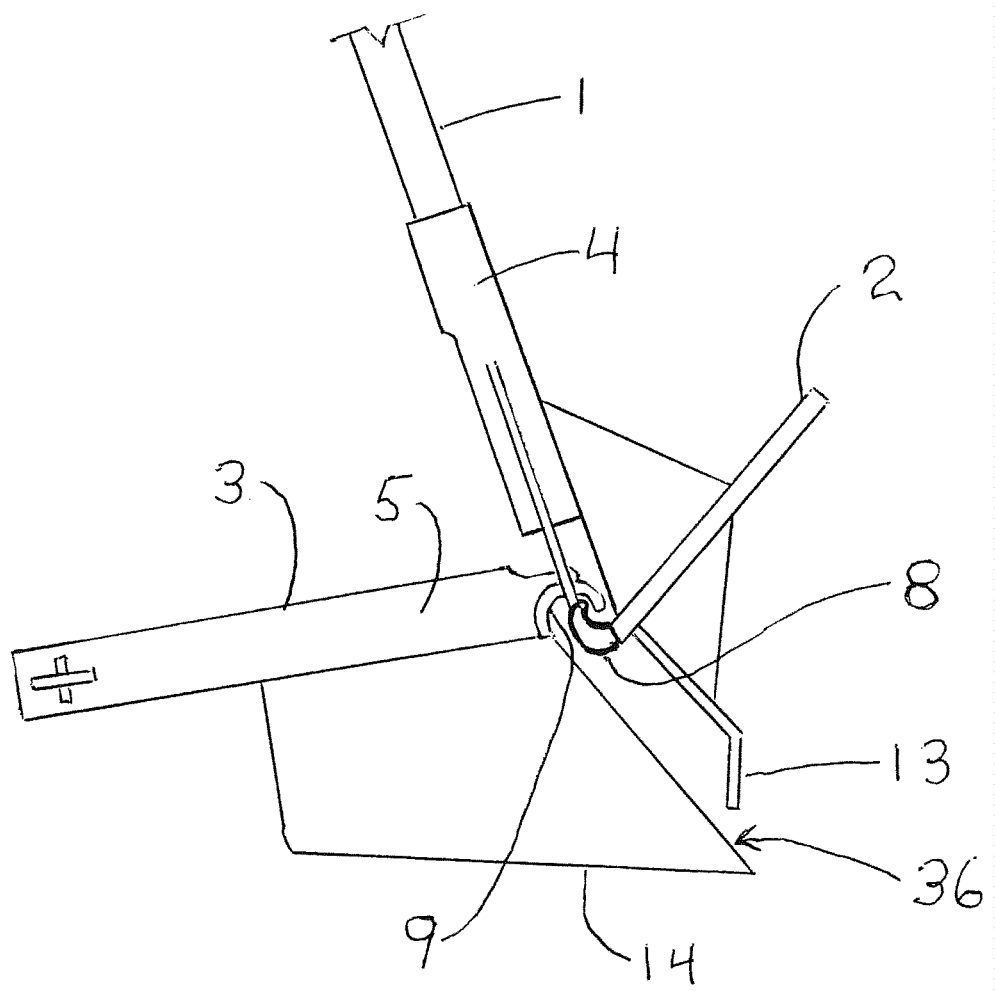
FIG. 5 is a side view of the animal waste collection and transport device showing the container pivoted so the front face is contacting the ground.
Figure 6:
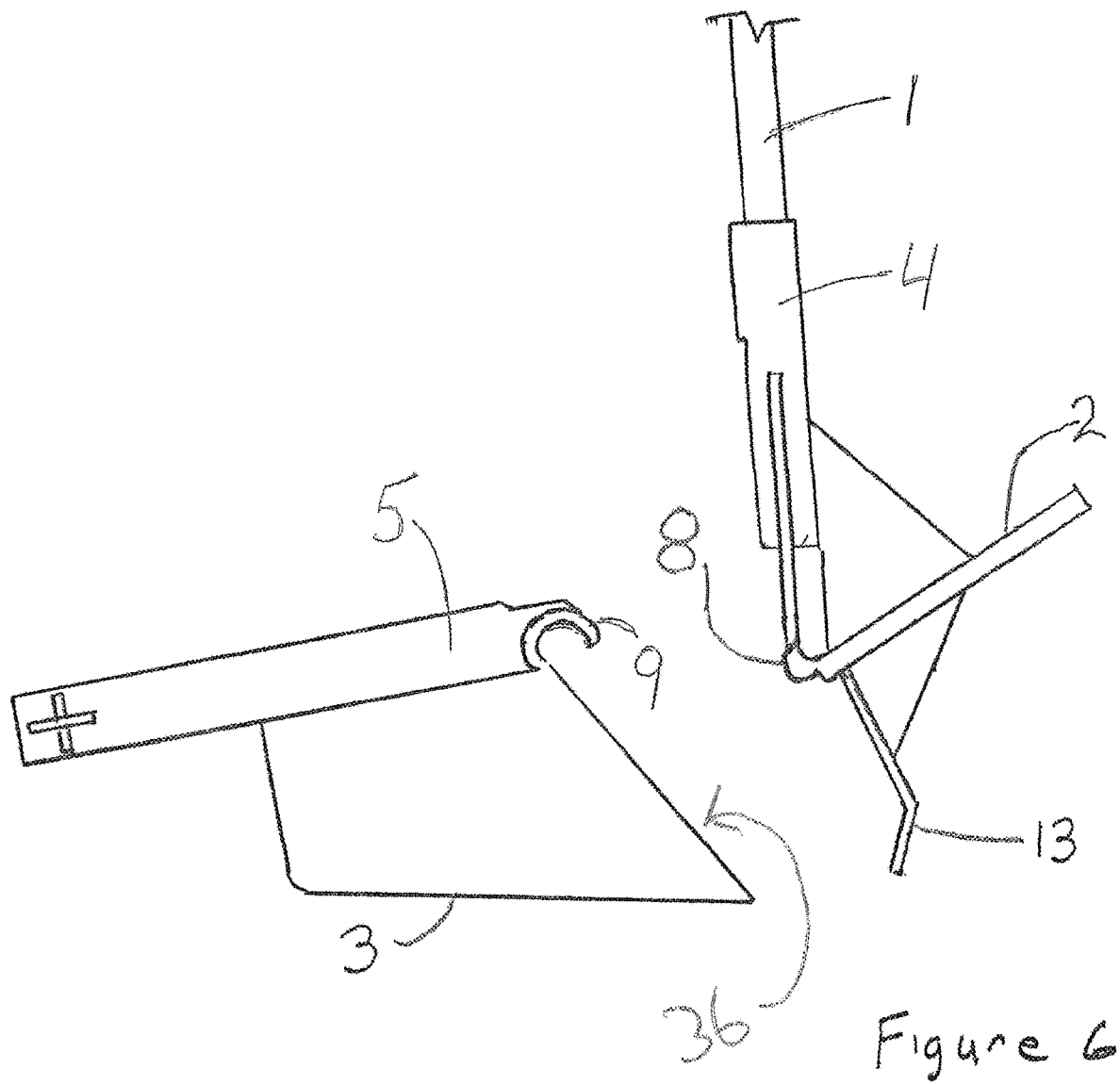
FIG. 6 is a side view of the animal waste collection and transport device showing the handle detached from the container.
Figure 6:
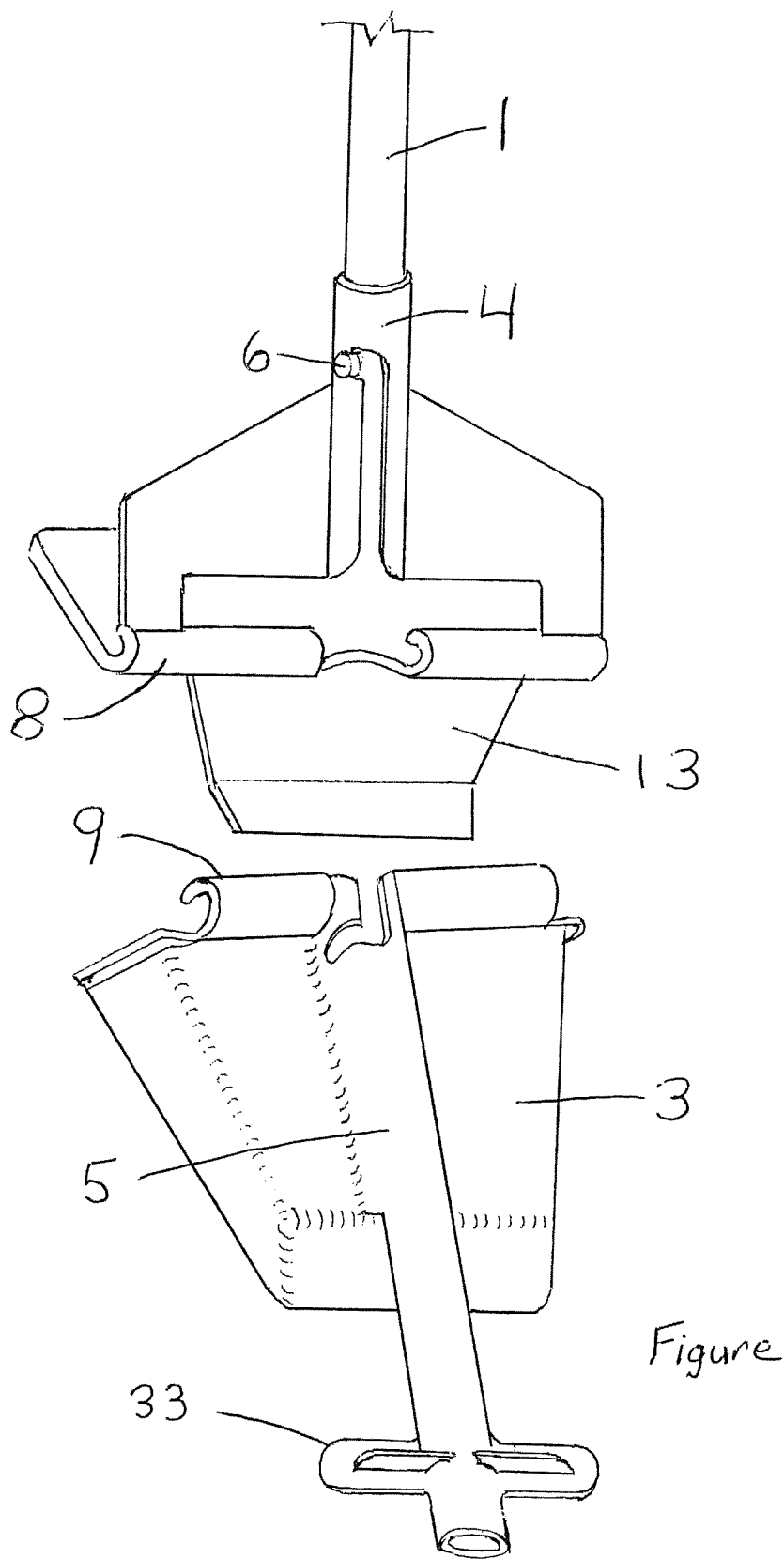

As shown best in FIGS. 4-6, in one embodiment the attachment assembly further comprises a mating surface 8 such as a curved lip extending from a portion of the handle 1 or lid 2, and a mating surface 9 such as a curved lip extending from a portion of the container 3. The two mating surfaces 8, 9, have opposing curved or angled surfaces adapted to receive each other to form a hinge allowing the container 3 to pivot relative to the handle 1 when the attachment assembly is in its second position (i.e., when the handle 1 is not received within the container passage 5). The mating surfaces 8, 9, engage each other so the container 3 hangs from the handle 1 when they are engaged and the components 1, 3 are raised off of the ground. The hinge allows the handle 1 to be manipulated and attached to/detached from the container 3 with one hand. Opposing mating surfaces 8, 9 may be engaged while the container 3 is open and resting on the ground (FIG. 5) by placing the mating surface 8 of the lid 2 under the mating surface 9 of the container 1. Raising the handle 1 off of the ground (FIG. 4) after the mating surfaces 8, 9 are engaged causes the container 3 to pivot to its closed position (FIGS. 1 and 2) wherein the attachment assembly is able to move from its second position (FIG. 3) to its first position (FIG. 2) and wherein the lid 2 is closed to cover the opening 36 in the container 3 and the handle 1 and container 3 are secured together.

FIG. 4 illustrates a diagram of an embodiment of the device partially opened revealing the scraping tool 13 attached to the lid 2. In this view, the handle 1 is in the unlatched position and the container 3 has partially pivoted about the hinge. In this position the container 3 is hanging from the lid 2. Holding the handle 1 vertically, the operator may move the container 3 to a convenient location in relation to the waste. FIG. 5 illustrates a diagram of an embodiment of side view of device with handle 1 in the unlatched position in relation to the lid 2. This view shows the container 3 pivoted so the front face 14 is contacting the ground. The container 3 rests on the ground as the lid 2 is lowered so the curved mating surface 8 of the lid 2 may release from the matching curved mating surface 9 of the container 3.

FIGS. 6 and 6A show the handle 1/lid 2 assembly free of the container 3, allowing operator to move the waste into the container 3 with the scraping tool 13. After the waste is positioned in the container 3, the device is reassembled by reversing the steps for disassembling the device. The waste and the parts of the device that came in contact with the waste, including the scraping tool 13, are sealed by the lid 2 inside the container 3.

Figure 7:
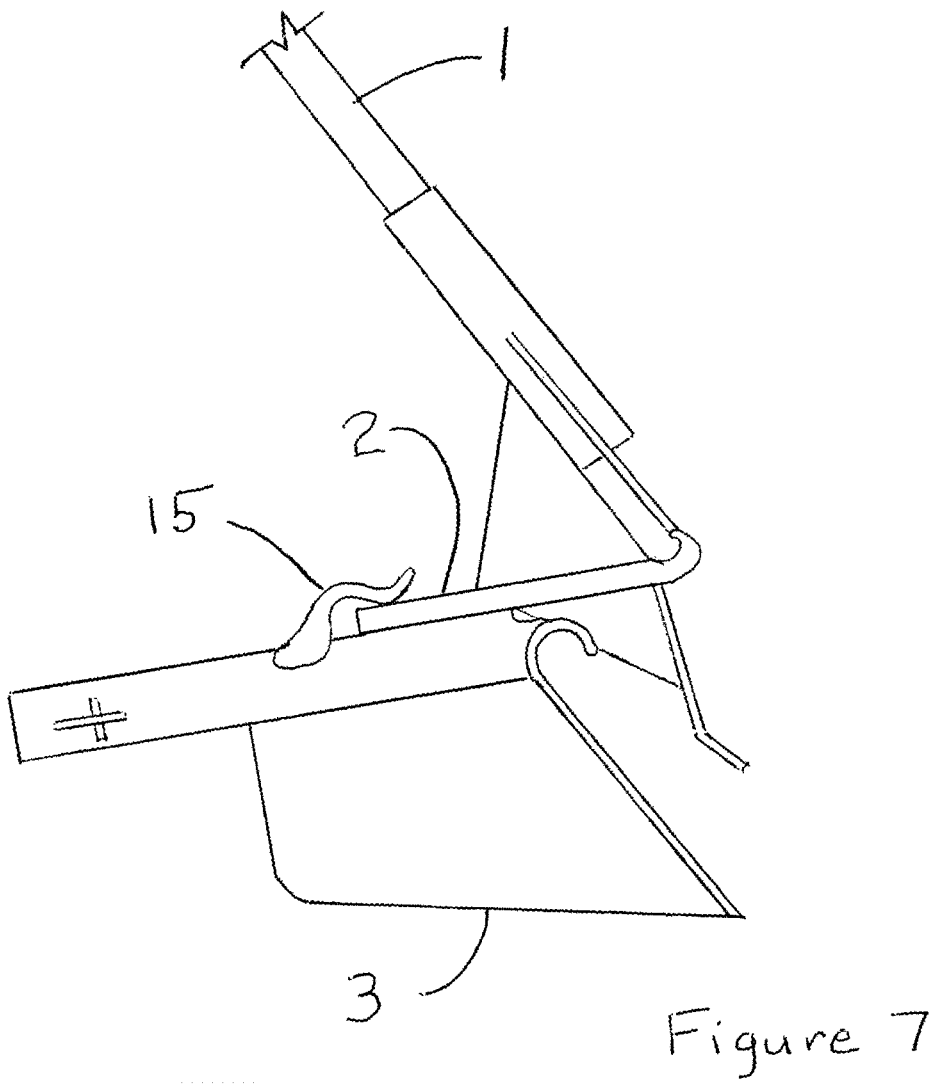
FIG. 7 is a side view of the animal waste collection and transport device showing an embodiment having a clip on the container configured to engage the lid.

FIG. 7 shows an embodiment wherein the container 3 includes a clip 15 configured to selectively engage the lid 2 allowing the operator to pick up the container 3 while in its open position. This allows the operator to pick up the container 3 with the handle 1 without sealing the opening 36 with the lid 2. The user can empty the container 3 without touching the container 3 itself.

To operate the device a person holds the handle 1 and positions the foot member 33 at the bottom of the container 3 under the toe of their shoe, or other suitable ridged object, to prevent the container 3 from rotating. The handle 1 is then rotated a partial turn which releases the pin 6 from its friction fit within the second friction fit region 7 near the bottom of the container passage 5. The handle 1 is moved upward which causes the pin 6 to move upward through the container passage 5 and handle passage 4. The handle 1 is again rotated a partial turn to secure the pin 6 in the handle/shaft into the first friction fit region 12.

The container 3 remains engaged with the handle 1 via the opposing mating surfaces 8, 9 after the pin 6 is moved upward into the handle passage 11. The handle 1 is then lowered toward the ground while the latching assembly remains in its second position so the container 3 pivots relative to the handle 1 about the mating surfaces 8, 9 on until the container 3 is flat on the ground near the dog waste. The handle 1 is lowered further to disconnect the opposing mating surfaces 8, 9 and fully separate the handle 1 from the container 3. The scraping tool 13 is used to move the animal waste into the container 3. The connection sequence is then reversed to close the lid 2 over the opening 36 in the container 3 and secure the container 3 to the handle 1 by placing the mating surface 8 of the lid 2 under the mating surface 9 of the container 1 and raising the handle 1 to pivot the container 3 upward off of the ground. As the handle 1 is then raised, the container 3 pivots into position under the lid 2 so that the lid 2 covers the opening in the container 3 and seals the animal waste in the container 3. The handle 1 is then rotated and moved to its second position wherein the handle 1 slides into its locked position near the bottom of the container passage 5. The lid 2 and container 3 passages 4, 5 are shaped such that when the handle 1 is inserted through both, opposing moment forces are applied about the lid 2/container 3 connection axis. These forces help align the components and seal the lid 2 to the container 3. In some embodiments the openings in the lid 2 and container 3 passages 4, 5 are tapered so they are wider near the top and narrower near the bottom. The constricting of the passages 4, 5 causes the components to move toward alignment as the handle 1 moves downward toward the lower end of the container passage 5. The handle 1 is then rotated a partial turn to secure the handle 1 and prevent it from sliding. The waste can then be carried to a proper disposal site where the container 3 can be emptied.

Figure 8:
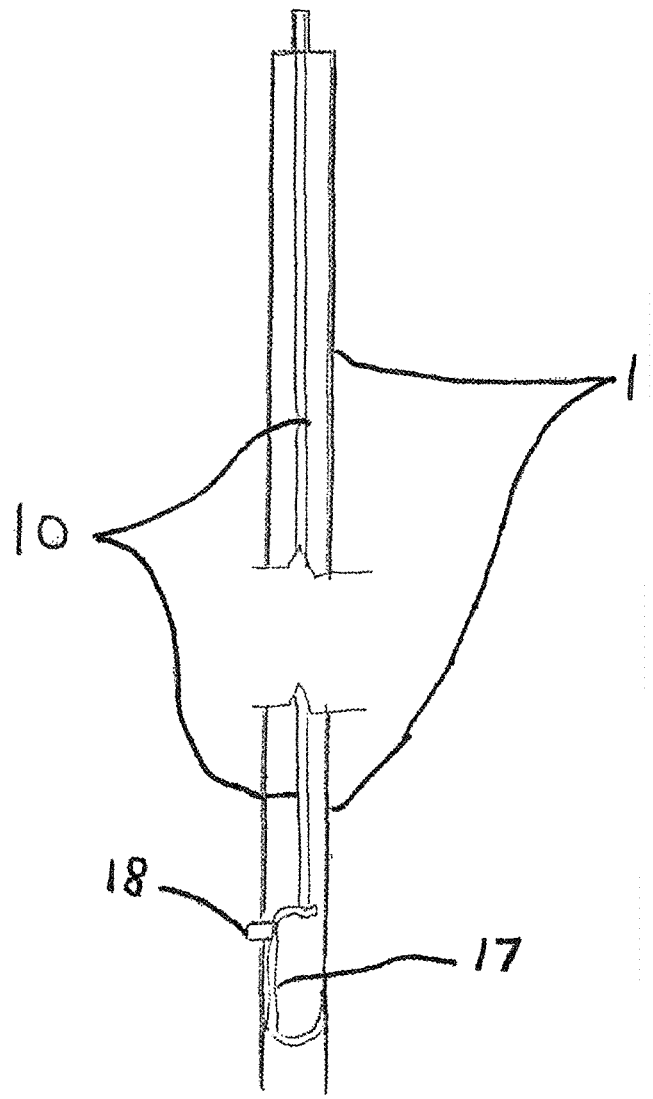
FIG. 8 is a section view of an alternate attachment assembly.
Figure 8A:
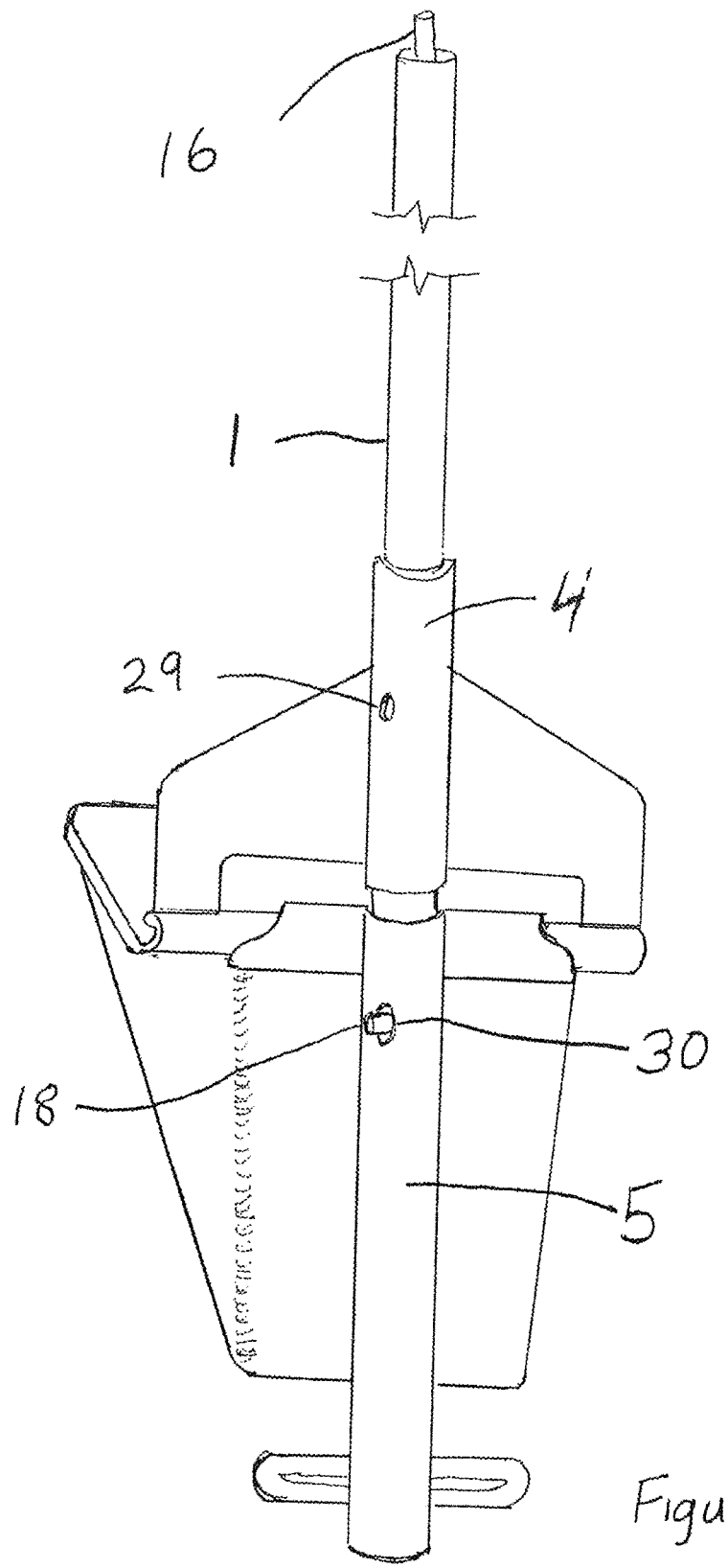
FIG. 8A is perspective view of the embodiment of FIG. 8 showing the engagement member securing the handle to the container.
Figure 9:
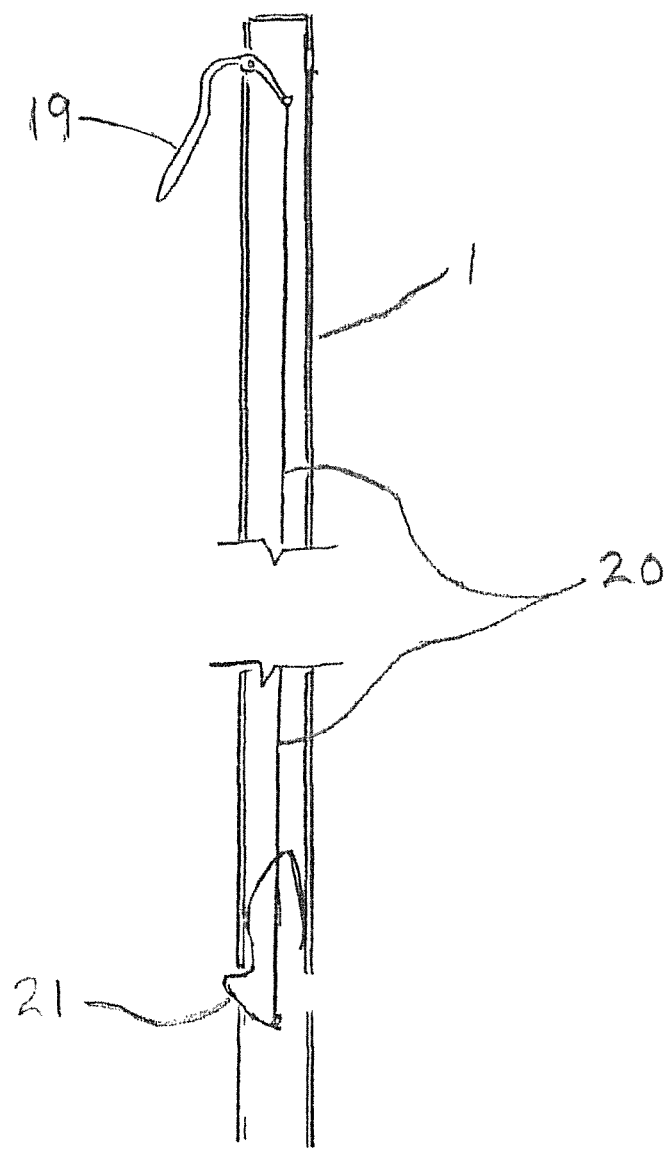
FIG. 9 is a section view of another alternative attachment assembly.
Figure 10:
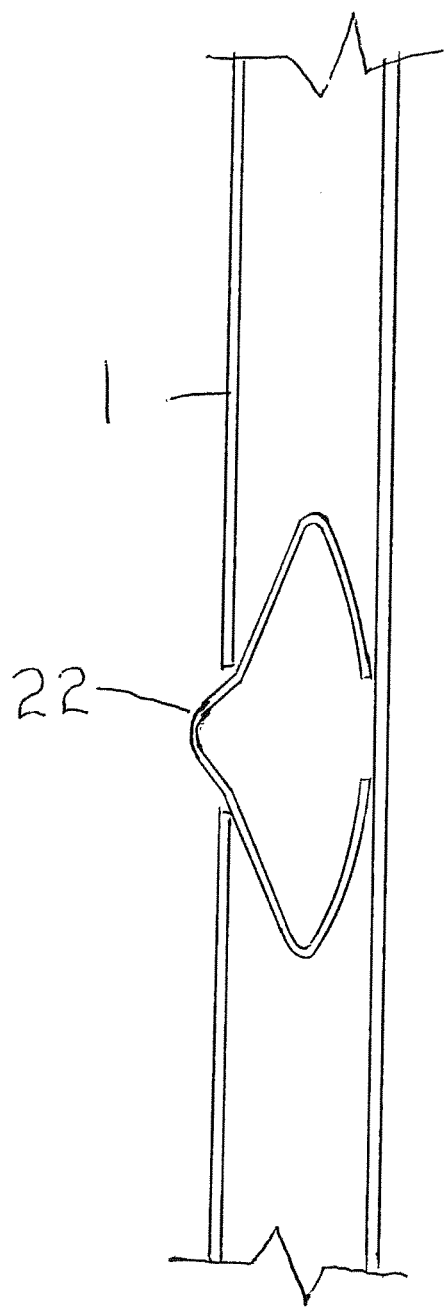
FIG. 10 is a section view of yet another alternate attachment assembly.

FIGS. 8-10 illustrate another embodiment having an alternate attachment assembly. A retractable engagement member is combined with the handle 1. The engagement member may be one of locking member 18, locking member 21, or locking member 22 as shown in FIGS. 8-10, respectively. The engagement member is configured to extend through an opening 30 in a portion of the container 3 or container passage 5 to secure the handle 1 to the container 3. The engagement member is movable between a first (extended) position where the engagement member extends through a portion of the container 3 or container passage 5 and a second (compressed) position where the engagement member retracts toward the handle 1 so it does not extend through the opening 30 in the container 3 or container passage 5. The engagement member is biased in its first position by a spring or other suitable means. The engagement member is moved to its second position to allow the container 3 to be separated from the handle 1. In its second position the handle 1 may be moved upward relative to the container passage 5 and handle passage 4 to separate the handle 1 from the container 3. In some embodiments the engagement member may be moved upward until it extends through an opening 29 in the handle passage 4. The engagement member may be pressed by the operator as shown in FIG. 10, or as shown in FIGS. 8-9, the engagement member may be combined with a mechanical assembly having an intermediate member such as a rod 16 (FIG. 8) or cable 20 (FIG. 9). The intermediate member is actuated by a lever 19 or other mechanical means to move the engagement member between its first and second position. When the intermediate member is pressed down, the spring 17 flexes retracting the engagement member to the second position allowing the handle 1 to be separated from the container 3. When the lever 19 or rod 16 is released, the spring 17 returns to is first position pushing the rod upward and the engagement member back to its locked position.

FIG. 10 shows an embodiment wherein the locking member 22 is also the spring or biasing member. The locking member/spring 22 has tapered surfaces that protrude through the opening 30 into the handle 1. The locking member/spring 22 has sufficient force to maintain the position of the lid 2, container 3 and contents relative to the handle 1. Restricting the position of the lid 2 or container 3 and pulling or pushing on the handle 1 with sufficient force will compress the locking member/spring 22 as the tapered portion is moved across the mating surface of the lid 2 or container 3. The handle 1 may be moved relative to the lid 2 or container 3 until the locking member/spring 22 is aligned with a void or indent in the mating surface of the lid 2 or container 3 which allows the locking member/spring 22 to protrude through the handle 1.

Figure 11:
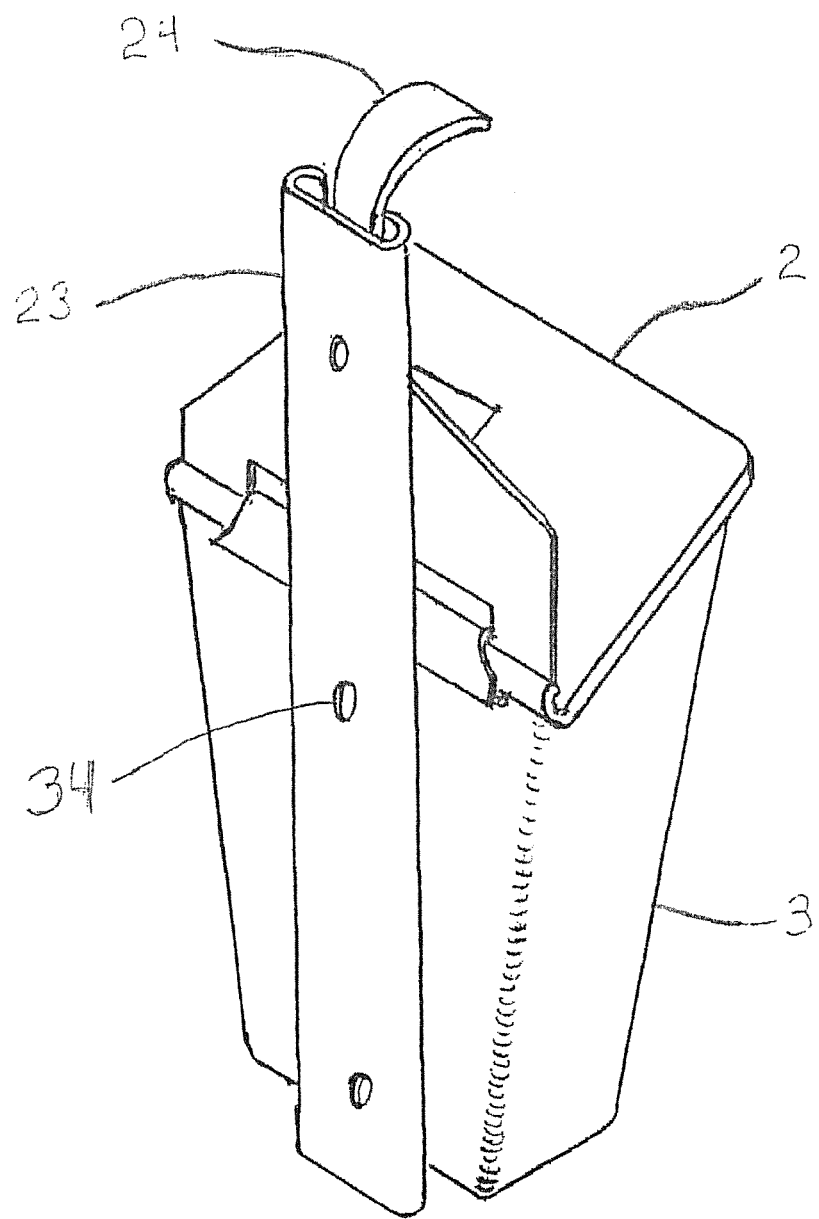
FIG. 11 is a perspective view of an alternate embodiment of the invention wherein the container is combined with an intermediate attachment member having a channel therein.
Figure 12:
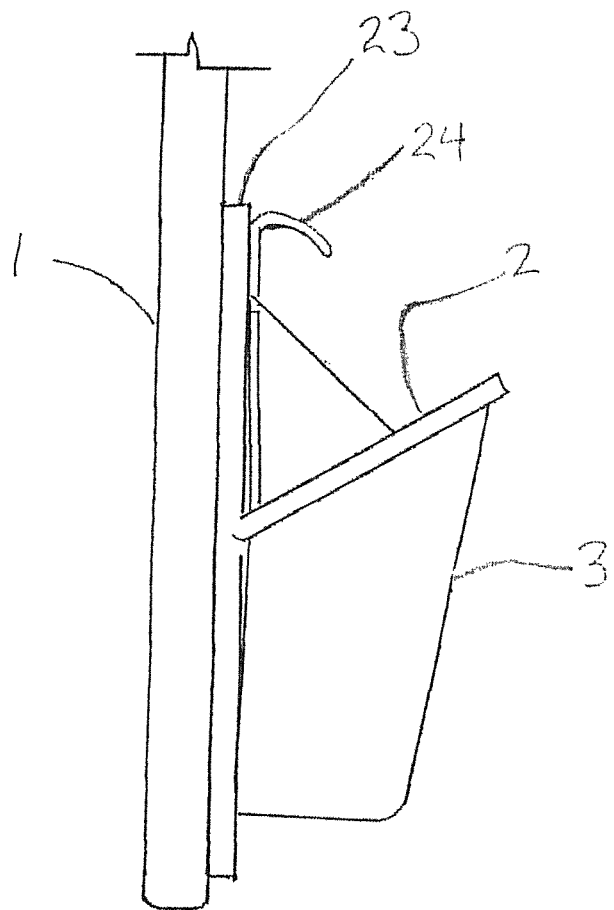
FIG. 12 is a side view of an alternative embodiment wherein the intermediate attachment member is attached to a handle/shaft.
Figure 13:
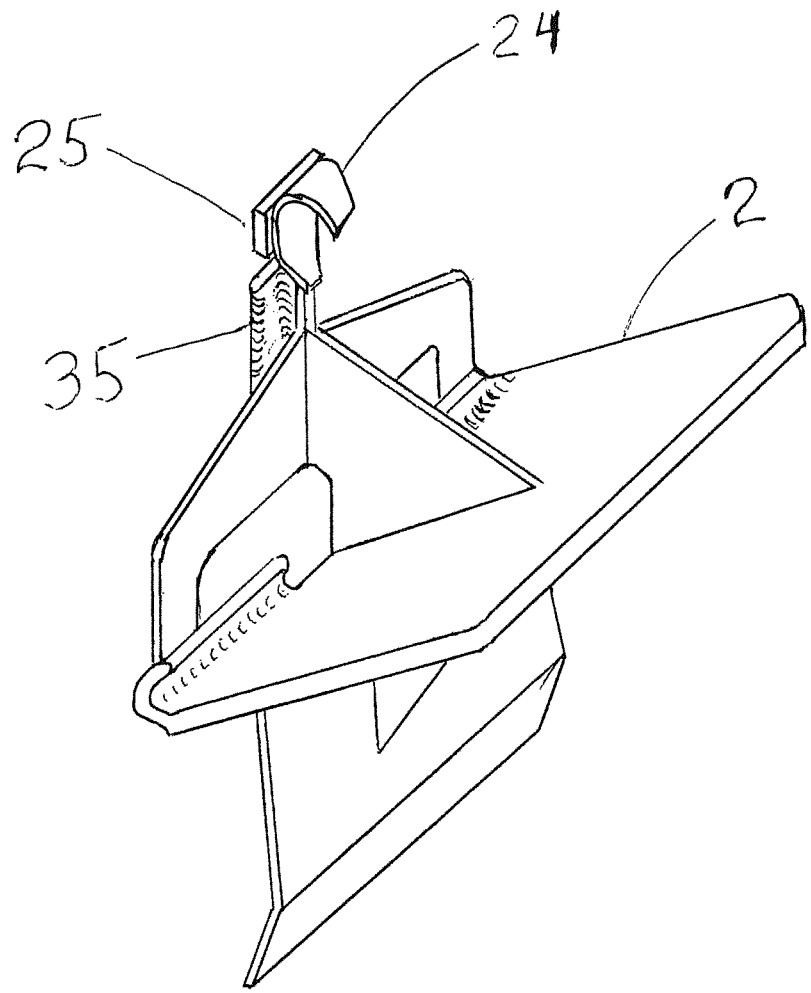
FIG. 13 is a perspective view showing an embodiment wherein the lid assembly has a flexible tab.
Figure 13A:
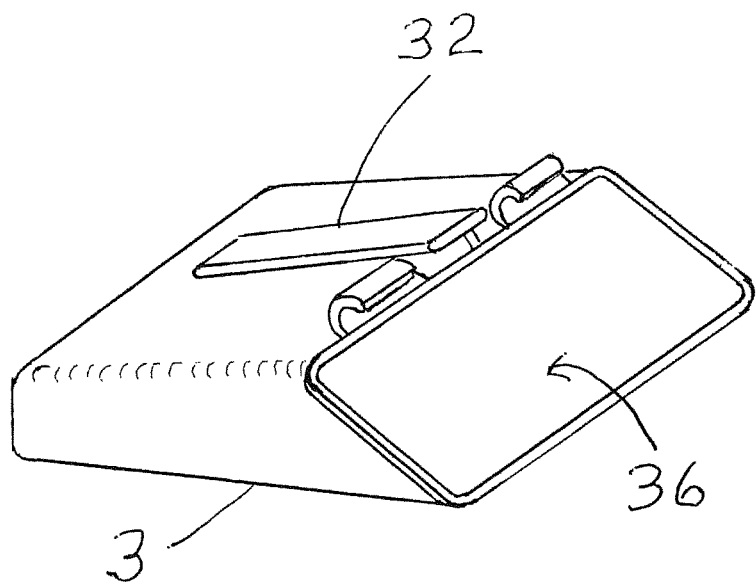
FIG. 13A is a perspective view of the embodiment of FIG. 13 showing the container.
Figure 13B:
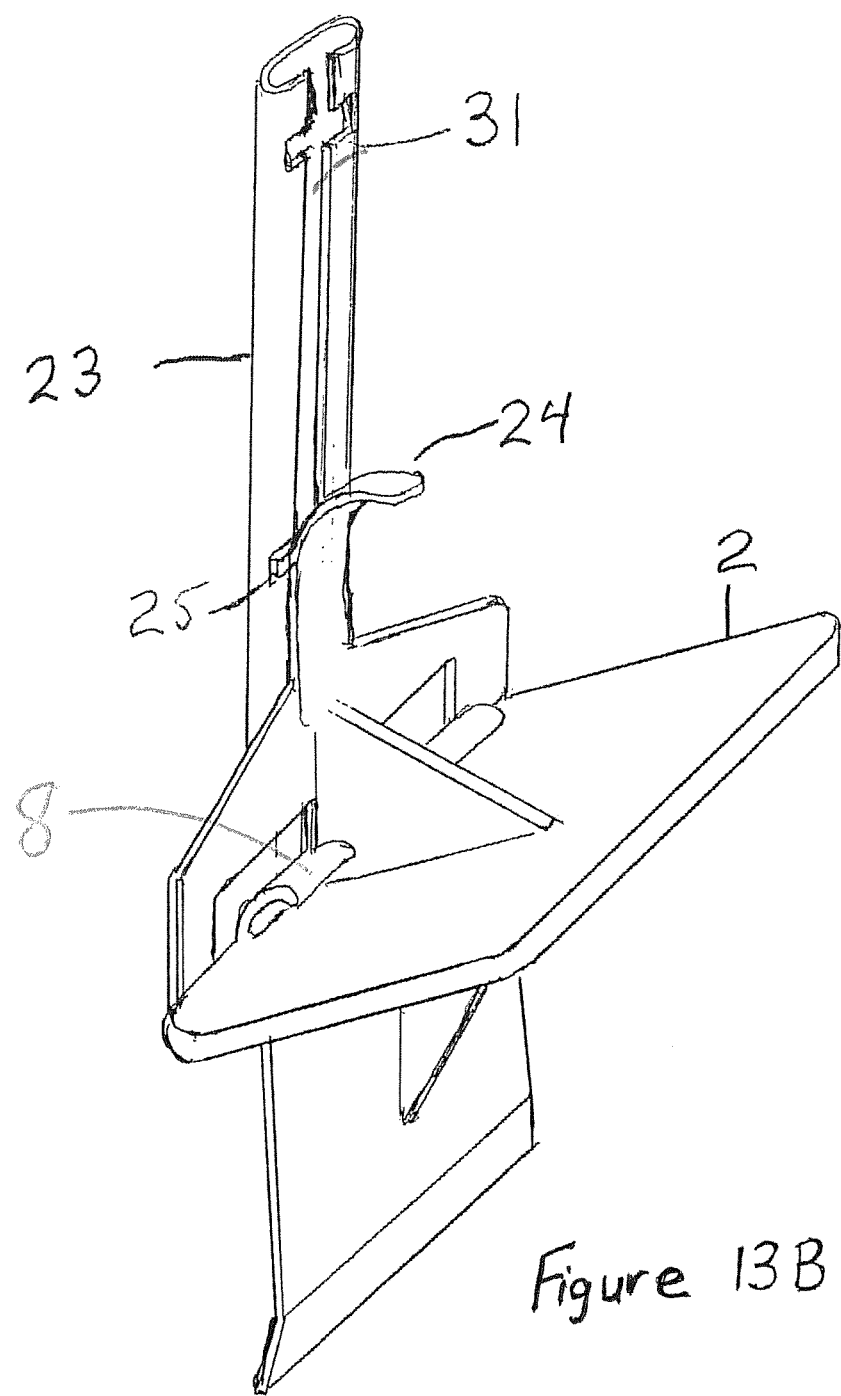
FIG. 13B is a perspective view of the embodiment of FIG. 13 showing the intermediate attachment member.

FIGS. 11-17 show another embodiment of the invention wherein the container 3 is removably combined with an intermediate attachment member 23. In some embodiments the intermediate attachment member 23 may function as the handle 1. In other embodiments the intermediate attachment member 23 is attached to another member, such as a dowel or broom handle, that functions as the handle 1. This allows the assembly to be manufactured or sold without an elongated handle 1, however, the operator may attach the assembly to any suitable handle 1. The intermediate attachment member 23 may by combined with a handle 1 by any suitable means. As shown in FIG. 11 the intermediate attachment member 23 may have one or more openings 34 adapted to receive screws, bolts, or other fastening means to secure the intermediate attachment member 23 to a handle 1. In some embodiments the attachment assembly described with respect to FIGS. 11-17 may be used directly with a handle 1 that does not include an intermediate attachment member 23.

FIGS. 12, 13, 13A, and 13B illustrate an embodiment where the intermediate attachment member 23 is attached to a handle 1. In the embodiment shown the handle 1 performs as a handle 1 but does not directly contact the lid 2 or container 3, however, in other embodiments the intermediate attachment member 23 may also function as the handle 1. The intermediate attachment member 23 has a channel 31 formed therein along its length. The lid 2 and container 3 have retaining members 32, 35 configured to be retained in the channel 31 yet allow the components 2, 3 to slide within the channel 31. In some embodiments the retaining member 32, 35 are T-shaped. There is an opening (not shown) in the bottom of the channel 31 through which the retaining members 32, 35 may pass to release them from the intermediate attachment member 23. The lid 2 includes an engagement member 24 having a protrusion 25 configured to be received in a portion of the channel 31 to secure the lid 2 at a desired location. Retracting the engagement member 24 moves the protrusion 25 to a retracted position where it is not received by a particular recess so the lid 2 is allowed to move along the length of the intermediate attachment member 23. The container 3 moves in the channel with the lid 2 when the mating surfaces 8, 9 of the components are engaged. In use, the lid 2/container 3 assembly is moved downward until the container's 3 retaining member 32 exits the opening in the bottom of the channel 31 and is below (completely outside of) the channel 31. In this position the container 3 can pivot relative to the lid 2 around the mating surfaces (hinge) and also be separated from the lid 2. The container 3 is placed on the ground as described above to collect waste, then reassembled by reversing the steps.

Figure 14:
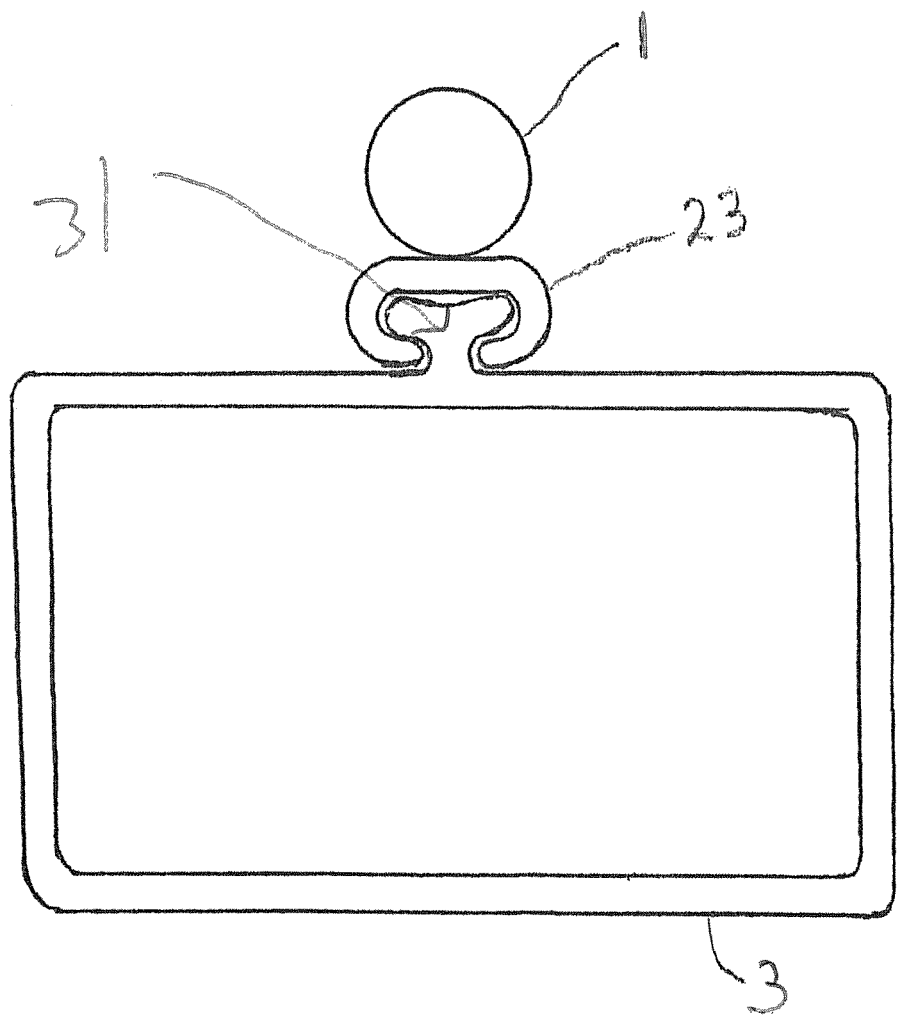
FIG. 14 is a section view of the container, intermediate attachment member, and handle.

FIG. 14 shows a cross section view of the container 3, intermediate attachment member 23, and handle 1. This shows the handle 1 attached to the intermediate attachment member 23.

Figure 15:
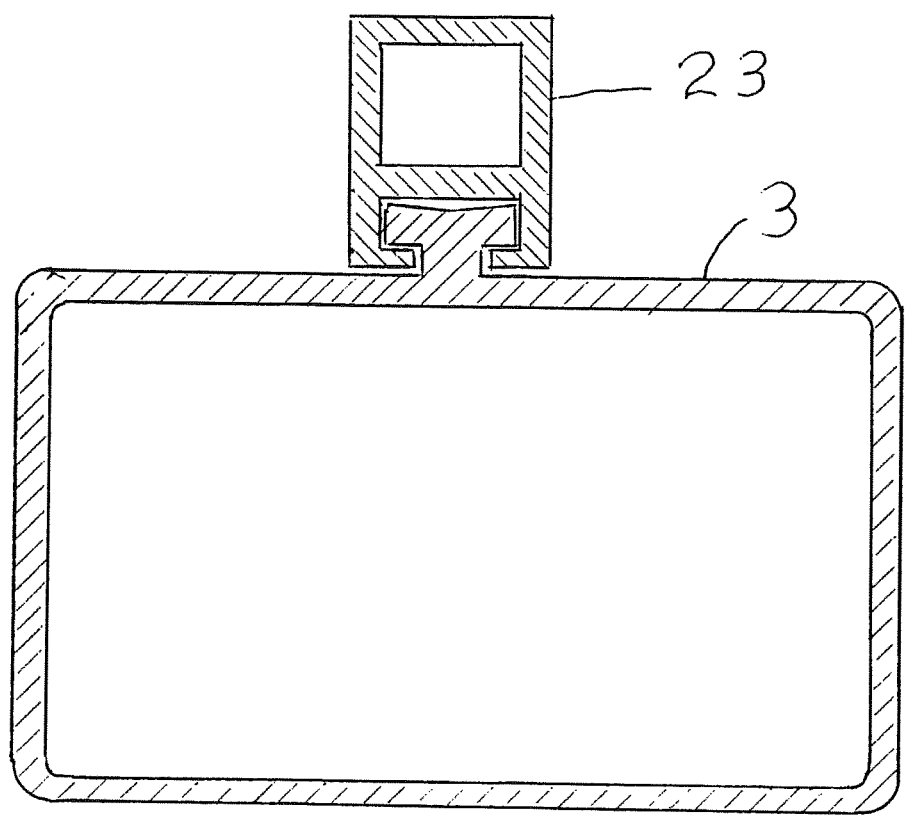
FIG. 15 is a section view of an alternate embodiment wherein the intermediate attachment member is incorporated into a large extrusion and not a separate part.

FIG. 15 illustrates an alternate embodiment of the container 3 and intermediate attachment member 23. This version shows the intermediate attachment member 23 may be incorporated into a large extrusion and not a separate part.

Figure 16:
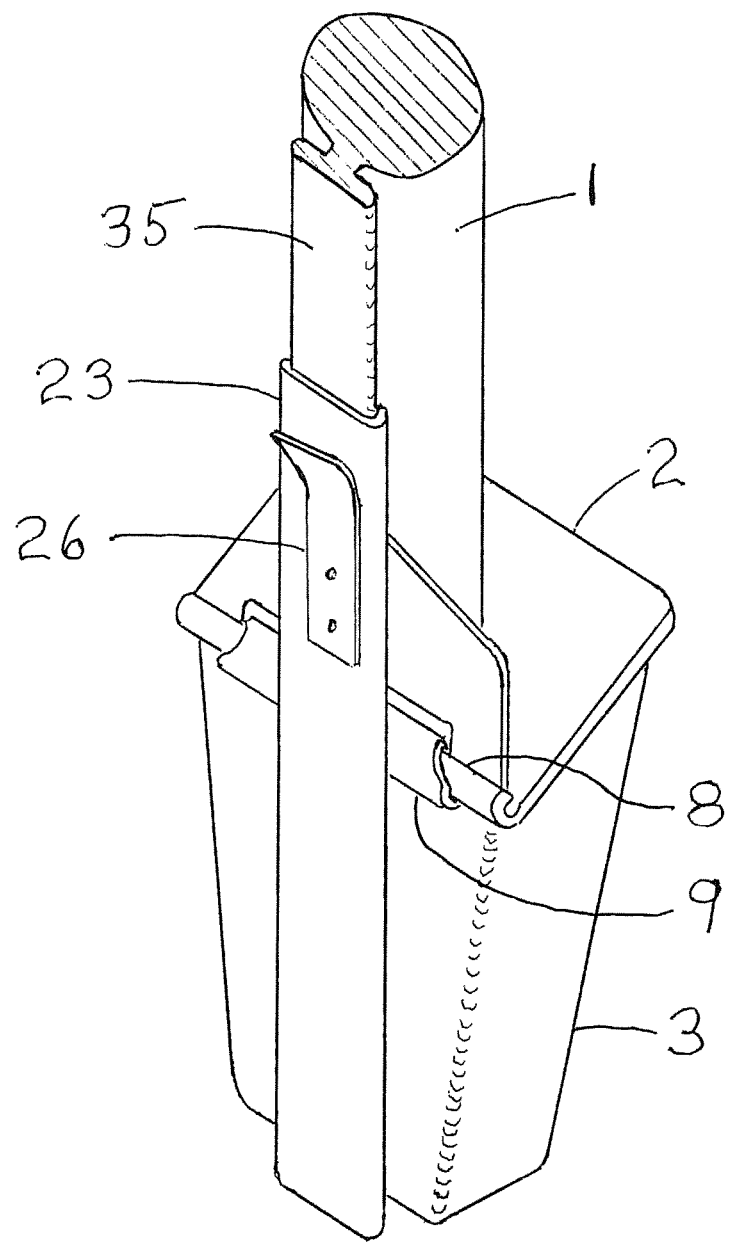
FIG. 16 is a perspective view showing an embodiment with the handle/shaft incorporated into the lid/container.
Figure 17:
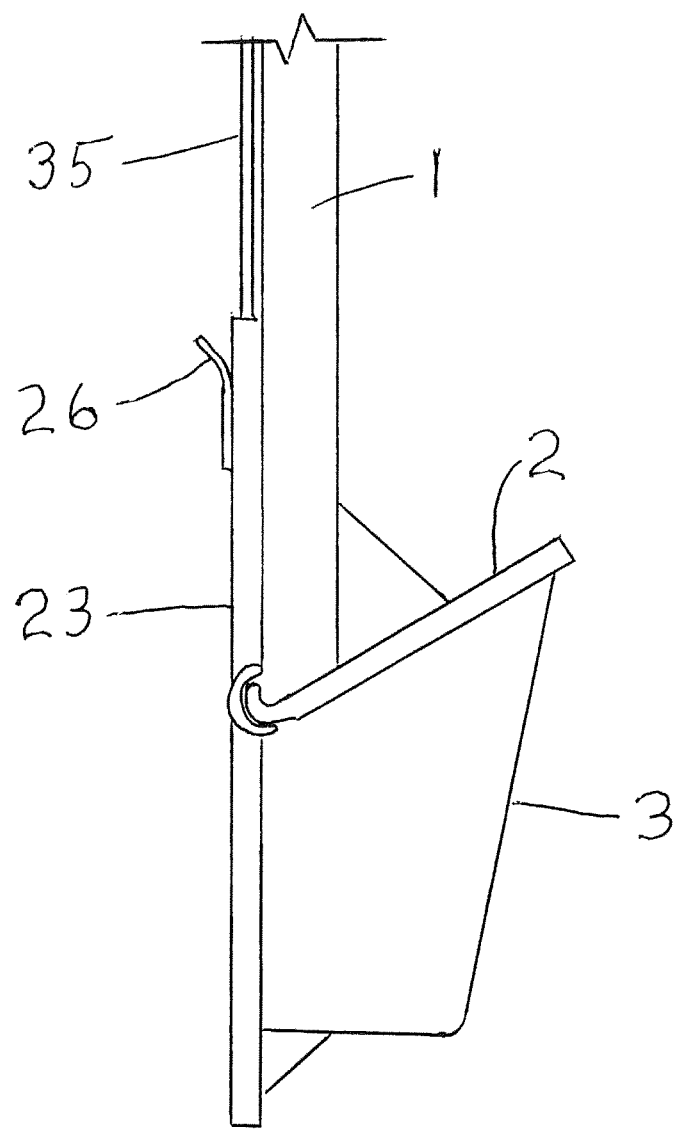
FIG. 17 is a side view the embodiment shown in FIG. 16.

FIGS. 16 and 17 show an alternate embodiment with the handle 1 incorporated into the lid 2. In this embodiment, a spring-biased engagement member 26 is combined with the intermediate attachment member 23. Disengaging the engagement member 26 releases the container 3 from contact with the intermediate attachment member 23 and allows the handle 1/lid 2 assembly to move relative to the intermediate attachment member 23. The device may then be operated to collect the waste.

Figure 18:
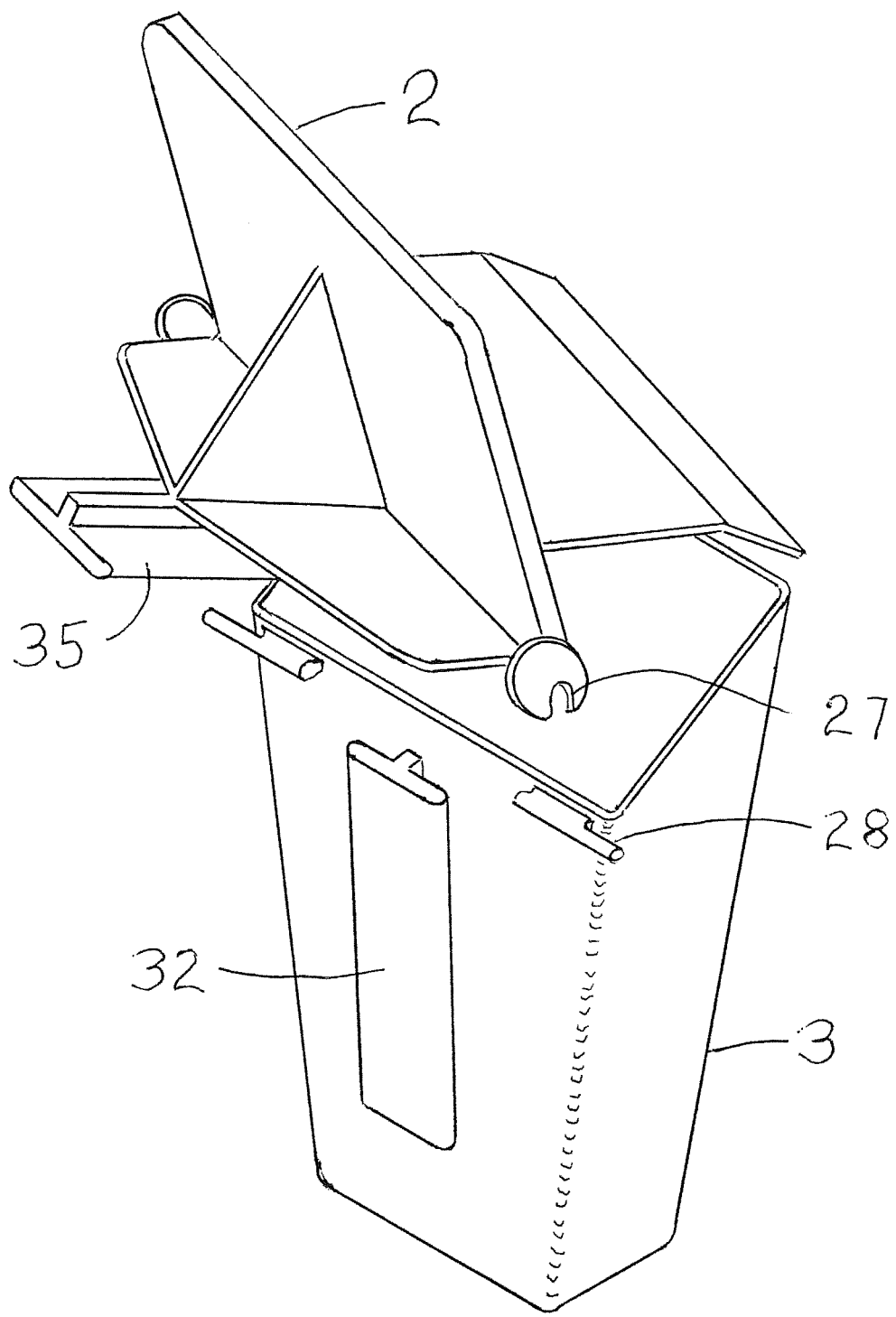
FIG. 18 is a perspective view of an alternate embodiment having a notched protrusion as the mating hinge element of the lid and a round protrusion as the mating hinge element of the container.

FIG. 18 shows an alternate embodiment wherein a notched protrusion 27 as the hinge mating surface of the lid 2 and a round protrusion 28 as the hinge mating surface of the container 3. The protrusions 27, 28 engage to form a hinge about which the components rotate relative to each other.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

The invention claimed is:

1. An animal waste collection and transport device comprising:
   a container configured to receive animal waste through an opening;
   a handle having a first portion and a second portion, the first portion configured to be grasped by an operator and the second portion having a waste scraping tool;
   an attachment assembly having a first position where the container is attached to the handle and a second position where the container is detachable from the handle;
   a container passage combined with the container and configured to receive a portion of the handle; and a lid combined with the second portion of the handle, wherein the lid is configured to cover the opening in the container when the attachment assembly is in the first position, wherein the attachment assembly includes an engagement member combined with the handle and movable between an engaged position and a release position, and wherein the engagement member is biased in the engaged position by a spring.

2. The animal waste collection and transport device of claim 1 wherein a waste collecting member is positioned within the container when the attachment assembly is in the first position.

3. The animal waste collection and transport device of claim 1 wherein the container passage includes a container passage opening and the engagement member is configured to extend through the container passage opening when in the engaged position to help secure the handle to the container.

4. The animal waste collection and transport device of claim 1 further comprising a handle passage combined with the second portion of the handle, wherein the handle passage includes a handle passage opening and the handle is movable through the handle passage opening relative to the handle passage.

5. The animal waste collection and transport device of claim 4 wherein the handle passage includes a first channel and the container passage includes a second channel, and wherein the engagement member is configured to be movable through the first channel and the second channel as the handle moves relative to the handle passage.

6. The animal waste collection and transport device of claim 1 wherein the container further comprises a clip configured to selectively attach to the lid.

7. The animal waste collection and transport device of claim 1 further comprising a first mating surface extending from a portion of the handle and a second mating surface extending from a portion of the container, wherein the first mating surface is configured to engage the second mating surface to form a hinge about which the container pivots relative to the handle.

8. An animal waste collection and transport device comprising:
   a container configured to receive animal waste through an opening;
   a handle having a first portion and a second portion, the first portion configured to be grasped by the operator and the second portion having a waste scraping tool;
   an attachment assembly having a first position where the container is attached to the handle and a second position where the container is detachable from the handle;
   a container passage combined with the container and configured to receive a portion of the handle; and
   a first mating surface extending from a portion of the handle and a second mating surface extending from a portion of the container, wherein the first mating surface is configured to engage the second mating surface to form a hinge about which the container pivots relative to the handle;
   wherein a waste collecting member is positioned within the container when the attachment assembly is in the first position.

9. The animal waste collection and transport device of claim 8 further comprising a lid combined with the second portion of the handle, wherein the lid is configured to cover the opening in the container when the attachment assembly is in the first position.

10. The animal waste collection and transport device of claim 8 wherein the attachment assembly includes an engagement member combined with the handle and movable between an engaged position and a release position.

11. The animal waste collection and transport device of claim 10 wherein the engagement member is biased in the engaged position by a spring.

12. The animal waste collection and transport device of claim 11 wherein the container passage includes a container passage opening and the engagement member is configured to extend through the container passage opening when in the engaged position to help secure the handle to the container.

13. The animal waste collection and transport device of claim 10 further comprising a handle passage combined with the second portion of the handle, wherein the handle passage includes a handle passage opening and the handle is movable through the handle passage opening relative to the handle passage.

14. The animal waste collection and transport device of claim 13 wherein the handle passage includes a first channel and the container passage includes a second channel, and wherein the engagement member is configured to be movable through the first channel and the second channel as the handle moves relative to the handle passage.

15. The animal waste collection and transport device of claim 8 wherein the container further comprises a clip configured to selectively attach to the lid.

16. An animal waste collection and transport device comprising:
   a container configured to receive animal waste through an opening, the container having a container retaining member;
   an intermediate attachment member having a channel formed therein configured to receive the container retaining member and allow the container to move relative to the intermediate attachment member, wherein the intermediate attachment member has a first portion and a second portion, the first portion configured to be combined with a handle and the second portion having a waste scraping tool;
   an attachment assembly having a first position where the container is attached to the intermediate attachment member and a second position where the container is detachable from the intermediate attachment member;
   a lid combined with the second portion of the handle, the lid having a lid retaining member configured to be received by the channel to allow the lid to move relative to the intermediate attachment member, wherein the lid is configured to cover the opening in the container when the attachment assembly is in the first position.

17. The animal waste collection and transport device of claim 16 wherein the waste collecting member is positioned within the container when the attachment assembly is in the first position.

18. The animal waste collection and transport device of claim 16 wherein the attachment assembly includes an engagement member combined with the handle and movable between an engaged position and a release position.

19. The animal waste collection and transport device of claim 18 wherein the engagement member is biased in the engaged position.

20. The animal waste collection and transport device of claim 16 wherein the container further comprises a clip configured to selectively attach to the lid.

21. The animal waste collection and transport device of claim 16 further comprising a first mating surface extending from a portion of the intermediate attachment member and a second mating surface extending from a portion of the container, wherein the first mating surface is configured to engage the second mating surface to form a hinge about which the container pivots relative to the intermediate attachment member.

22. The animal waste collection and transport device of claim 16 wherein the intermediate attachment member is a handle.

\* \* \* \* \*